(No Model.)

G. A. SHAW.
COMBINED BICYCLE STOOL AND POUCH.

No. 585,485. Patented June 29, 1897.

Witnesses.
E. R. Case
H. Dennison

Inventor.
G. A. Shaw
by
Fetherstonhaugh & Co.
attys

THE NORRIS PETERS CO., PHOTO-LITHO., WASHINGTON, D. C.

United States Patent Office.

GEORGE ALEXANDER SHAW, OF TORONTO, CANADA, ASSIGNOR OF ONE-HALF TO WILLIAM HOWARD HUNTER, OF SAME PLACE.

COMBINED BICYCLE STOOL AND POUCH.

SPECIFICATION forming part of Letters Patent No. 585,485, dated June 29, 1897.

Application filed August 8, 1896. Serial No. 602,167. (No model.)

*To all whom it may concern:*

Be it known that I, GEORGE ALEXANDER SHAW, of the city of Toronto, in the county of York, in the Province of Ontario, Canada, have invented certain new and useful Improvements in a Combined Bicycle Stool and Pouch, of which the following is a specification.

My invention relates to improvements in a combined bicycle stool and pouch particularly adapted for bicyclists' use; and the object of the invention is to design an article of this class which may be conveniently carried on the bicycle and may be utilized by the bicyclist for a seat after an extended journey and, if desired, form a serviceable means whereby he may readily repair the bicycle, utilizing the combined device and tools held therein; and it consists, essentially, preferably of a substantially triangular piece of leather having connected thereto a triangular wire frame, preferably at one edge only, and of three legs having holes in the ends by which they are connected to the triangular frame, upon which they are designed to be adjusted to form a stool, the legs being arranged to lie parallel and be held together when the seat is folded and held to the bicycle, the parts being constructed and arranged in the manner hereinafter more particularly explained.

Figure 1:
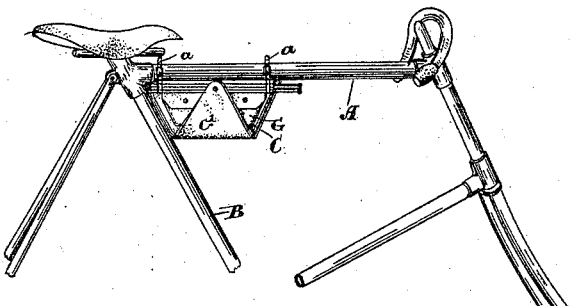
Figure 2:
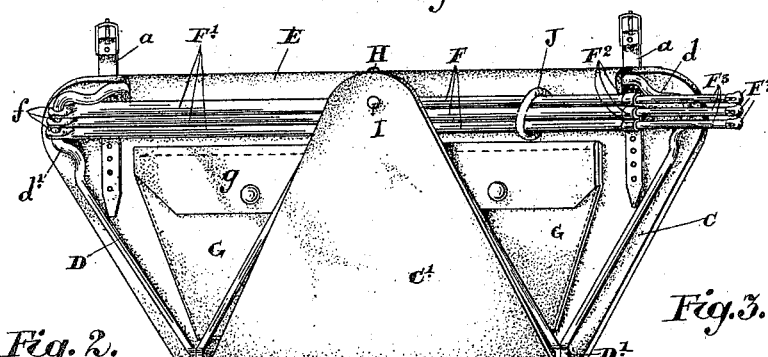
Figure 3:
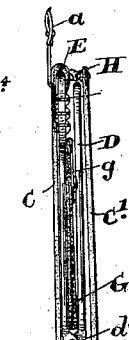
Figure 6:
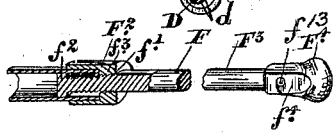
Figures 4, 5:
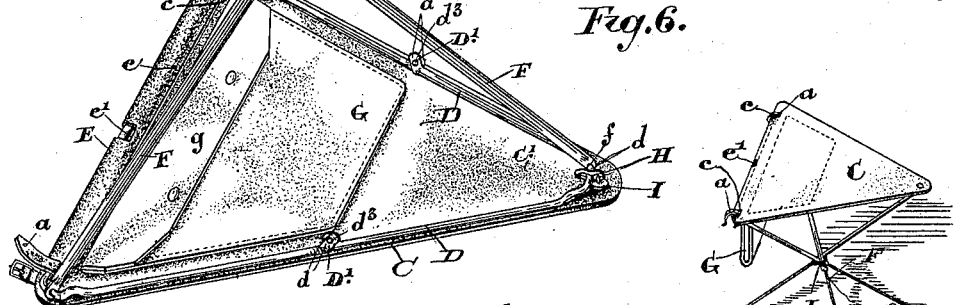
Figure 7:

Figure 1 is a perspective view of the top portion of the frame of a bicycle, showing my combined camp-stool and pouch secured in position. Fig. 2 is an enlarged view of the combined camp-stool and pouch, showing it as it would appear when unstrapped from the top reach of the bicycle. Fig. 3 is an edge view of Fig. 2. Fig. 4 is an enlarged perspective bottom view of the camp-stool when opened out for use. Fig. 5 is a reduced perspective view of the camp-stool ready for use. Fig. 6 is a sectional detail of one of the extensible legs. Fig. 7 is an enlarged plan view of the preferred form of joint.

In the drawings like letters of reference indicate corresponding parts in each figure.

A is the top reach of the bicycle, and B the rear standard.

C is the triangular leather top of my combined camp-stool and pouch.

D is the triangular wire frame, one side of which is held in the under-turned flap E, attached to or forming part of the triangular top, the side flap being connected by a row of stitching $e$ to the inside at the top.

It will be noticed that each corner of the triangular frame is formed, preferably, in the shape of a U, as indicated by the letters $d$, $d$, and $d'$.

F are the legs, the inner portions $F'$ of which are made, preferably, tubular and flattened out at the inner ends and provided with holes $f$, by which they are held upon the triangular frame D, around which two of them are designed to be moved to place them in position for use, as hereinafter described.

$F^2$ are sleeves which are secured to the outer end of the tubular portions $F'$ of the legs by brazing or in any other suitable manner.

$F^3$ are the lower portions of the legs, which are preferably made of a rod of suitable strength, with a threaded upper portion $f'$ and a head $f^2$. The threaded enlargement is designed to be brought partially through the internally-threaded hole $f^3$, made in the sleeve $F^2$, when the legs are extended in order that the camp-stool may be set up. The head $f^2$ fits snugly the interior of the tubular portions $F'$, within which it is of course readily adjustable and serves as a brace to strengthen the connection between the portion $F'$ and rod portion $F^3$.

$F^4$ is a knob which is secured at the outer end of the rod portion $F^3$, being preferably formed with a socket into which the rod extends and through which and the rod a pin $f^{13}$ extends to hold them together. The knob is provided with flattened sides $f^4$, as indicated. The flattened sides $f^4$ of the knob serve as a ready means for gripping the end of the rod portion $F^3$ in order to turn it a sufficient number of times, either to draw out the rod portion sufficiently to form and hold in position the extensible leg or to turn it in the reverse direction, so as to push the rod portion back into the position shown in Figs. 1 and 2. The knobs $F^4$ are designed to prevent the bottom ends of the legs from sticking in the ground.

G is a pouch which is provided with the usual flap $g$ and is preferably secured at the flap end only to the top C in order that it will hang down at right angles to the top and therefore be convenient for use when the stool is set up. (See Fig. 5.) The pouch is provided with suitable fastenings.

In the drawings I show the triangular frame as divided intermediately at two sides and provided with opposite joints D', which preferably consist of oblique upwardly-extending flattened ends $d^2$ $d^2$ of the wires formed at an angle to the line of the wire, as indicated in Fig. 7, with the flattened sides of the opposite joints parallel and in line with each other and connected together by rivets $d^3$. The center line running through both rivets must necessarily be parallel to the edge of the top, on which is formed the holding-flap E, so that the portion C' of the top may be folded over into the position shown in Figs. 1 and 2. Although I show this simple joint D' as a preferable means for connecting the two sides of the triangle intermediately, it will of course be understood that any suitable form of socket-joint might be employed and accomplish the object which I wish to attain—that is to say, to enable me to fold the wire and portion C' up as indicated. Again, although I show these joints, it will of course be understood that they might be dispensed with and the triangular wire frame solidly jointed, especially where my device is designed to be placed on a gentleman's bicycle. In a lady's bicycle, however, it must be necessarily folded on account of the limited space to receive it.

In Fig. 4 it will be seen that I cut a notch $e'$ in the center of the flap E, so as to leave a portion of the wire D exposed. It will also be seen that I provide a hook H, which is pivotally connected to a rivet I, which is fastened in the apex or corner of the triangular flap opposite the side having the flap E.

When the stool is spread open for use, two of the legs F are passed around from the enlarged U-shaped corner or apex $d'$ to the opposite corners. A ring J is also provided, which is always held upon the legs above the sleeves $F^2$, which prevent it from coming off. By snapping on the hook H over the U-shaped apex $d$ after the leg has been adjusted into position in this apex the wire frame is held out taut and prevented from collapsing, thereby adding greatly to the rigidity of the stool. Before the legs are restored to their normal position for carrying—that is to say, into the enlarged U-shaped apex $d'$—the hook is uncoupled. Upon the ends of the legs being replaced in the enlarged U-shaped apex $d'$ the hook H may be grasped and brought to engage with the wire D inside of the notch $e'$ in the flap E and the parts thereby folded and secured together.

In order to secure my improved combined camp-stool and pouch when folded in position, I provide straps $a$ $a$ with buckles, which pass through holes $c$ in the top C, as indicated in Fig. 5, the ends of the strap being buckled over the reach A, as indicated in Fig. 1. The straps $a$ also serve to hold the legs F together.

Should it be desired to get at the pouch when on the bicycle, this may be readily done by unfastening the hook H and throwing down the portion C' of the top.

Such a device as I describe will be particularly adaptable for bicyclists in taking long journeys and also for military purposes when bicycles are used, as the stool will not only form a necessary adjunct to camp life, but also form a rest for a rifle, while the depending flap when the stool is in position may be conveniently got at to withdraw cartridges or other contents required for the riding of the bicycle or accessories employed in the use of a rifle.

Although in this specification I describe the top of the camp-stool as being made triangular, it will be understood that it might be made in the form of a rectangle, in which case the wire frame would be changed to suit.

Again, I might secure a supplemental pouch underneath the folding portion C', leaving sufficient space, however, between the pouches to provide for the ready folding of the portions C' over the major portion of the top. In this specification I have described the straps as applied only for the purpose of holding my combined stool and pouch to the reach. I might also employ them, however, for enwrapping the inner ends of the legs and buckling the end of each strap together, so as, if necessary, to securely hold the inner ends of the legs at the apexes of the triangular frame. I may finally add that if I make the wire frame in one piece, as hereinbefore premised, I would have to provide an extra strap at the lower apex, so as to fasten the top and frame to the rear post of the bicycle and thereby prevent it swinging.

What I claim as my invention is—

1. In a combined camp-stool and pouch, in combination the top provided with an edge flap at one side, the continuous triangular wire frame having one side secured in the edge flap, the legs movably connected with the wire frame whereby they are adapted to be slid to the apexes thereof, and means for holding the legs together when in the folded or unfolded positions, substantially as described.

2. In a combined camp-stool and pouch, the combination with the top and frame and the pouch flexibly connected to the under side of the top and the legs adjustably connected to the frame, of the end straps passing through the holes in the top and buckled over to encompass the legs and adapted to be secured to the reach of the bicycle as and for the purpose specified.

3. In combination, the triangular wire frame having a hinged portion adapted to fold over against the main portion, the top having a flap connected to the frame, the folding legs connected with the frame, means for holding the legs when unfolded, and means for holding the flap against the main portion when the parts are folded, substantially as described.

4. In combination, the triangular wire frame having two of its wires hinged centrally to form a folding portion, the top having a flap embracing the third wire, said flap having a notch or opening, the folding legs connected with the frame, and the hook upon the apex of the folding portion adapted to clip over the portion of the wire exposed by said notch or opening to hold the article folded, substantially as described.

5. In combination, the continuous angular frame of rigid material, the top suitably connected thereto, the supporting-legs movably connected to said frame and adapted to be slid into the corners or angles of the frame, and means for holding the legs together when in use, substantially as described.

6. In combination, the triangular frame of rigid material having U-shaped portions or bends forming offsets at each side of the corners of the triangle, the top suitably connected to said frame, the legs having their upper ends slidably connected with said frame, and the means for holding the legs together when spread, substantially as described.

7. In an article such as described, in combination, the top, the continuous-wire angular frame permanently secured thereto at one side only and composed of two parts hinged together, the supporting-legs having holes in their upper ends and designed to be slid into one apex and into the apices of the frame upon the remaining free sides, a detachable connection between the opposite angle of the wire to the permanently-fixed side and the top and the ring designed to hold the legs together as specified.

8. In an article such as described, in combination the top, the continuous-wire angular frame permanently secured thereto at one side only and composed of two parts hinged together, the supporting-legs slidably connected at the top to the triangular frame and designed to slide into one of the apices of the frame when the legs are placed adjacent for folding, the ring for holding the legs together, and a swiveled hook designed to be attached to the free apex of the top and clasp the free angle of the frame or the permanent side as and for the purpose specified.

GEORGE ALEXANDER SHAW.

Witnesses:
B. BOYD,
H. DENNISON.